(12) United States Patent
Drencko (10) Patent No.: US 11,565,913 B2
(45) Date of Patent: Jan. 31, 2023

(54) PLATE CONVEYOR BELT

(71) Applicant: Innova Patent GmbH, Wolfurt (AT)

(72) Inventor: Jiri Drencko, Most (CZ)

(73) Assignee: Innova Patent GmbH, Wolfurt (AT)

( * ) Notice: Subject to any disclaimer, the term of this patent is extended or adjusted under 35 U.S.C. 154(b) by 30 days.

(21) Appl. No.: 17/598,403

(22) PCT Filed: Mar. 12, 2020

(86) PCT No.: PCT/EP2020/056722
§ 371 (c)(1),
(2) Date: Sep. 27, 2021

(87) PCT Pub. No.: WO2020/193165
PCT Pub. Date: Oct. 1, 2020

(65) Prior Publication Data
US 2022/0162041 A1    May 26, 2022

(30) Foreign Application Priority Data

Mar. 25, 2019 (AT) .............................. A 50255/2019

(51) Int. Cl.
*B66B 23/08* (2006.01)
*B66B 21/10* (2006.01)
*B66B 23/14* (2006.01)
*B65G 21/02* (2006.01)

(52) U.S. Cl.
CPC .............. *B66B 23/08* (2013.01); *B66B 21/10* (2013.01); *B66B 23/14* (2013.01); *B65G 21/02* (2013.01)

(58) Field of Classification Search
CPC ... B66B 23/14; B66B 2023/142; B66B 23/08; B66B 21/10; B65G 21/02; B65G 21/06
USPC ........................... 198/321, 327, 860.1, 861.1
See application file for complete search history.

(56) References Cited

U.S. PATENT DOCUMENTS

| | | | |
|---|---|---|---|
| 3,498,445 A * | 3/1970 | Piper | B66B 23/14 198/833 |
| 7,594,570 B2 | 9/2009 | Miessbacher | |
| 2003/0116402 A1* | 6/2003 | Krampl | B66B 23/00 198/321 |

(Continued)

FOREIGN PATENT DOCUMENTS

| | | |
|---|---|---|
| DE | 1456375 A1 | 12/1968 |
| DE | 2252134 A1 | 4/1974 |
| EP | 0013793 A1 | 8/1980 |

(Continued)

*Primary Examiner* — James R Bidwell
(74) *Attorney, Agent, or Firm* — Laurence A. Greenberg; Werner H. Stemer; Ralph E. Locher (57) ABSTRACT

A plate conveyor for moving walkways contains a track system having tracks, which track system is formed by track elements, and a central track serving as a guide for plate conveyor elements of the plate conveyor. The length of the track system can be adjusted. For this purpose, substantially triangular openings which are delimited by bars are provided between track elements that adjoin one another. Triangular or trapezoidal length adjusting pieces are inserted into the openings and are pushed in to such an extent that the oblique edges of the length adjusting pieces abut the edges of the openings formed by the bars. The central tracks of the track elements that adjoin one another are connected to one another by coupling pieces.

14 Claims, 7 Drawing Sheets

(56) References Cited

U.S. PATENT DOCUMENTS

2017/0233224 A1* 8/2017 Schneider ............... B66B 21/10
  198/321
2020/0377341 A1* 12/2020 Illedits ................... B66B 23/10

FOREIGN PATENT DOCUMENTS

| JP | H112287062 A | 8/1999 |
| JP | 2003335489 A | 11/2003 |
| WO | 03066500 A1 | 8/2003 |

* cited by examiner

PLATE CONVEYOR BELT

FIELD AND BACKGROUND OF THE INVENTION

The invention relates to a plate conveyor belt having the features of the introductory part of the independent claim.

Such plate conveyor belts are used for moving walkways.

The use of conveying means such as conveyor belts and escalators has already been known since about the year 1900 from department stores in London and New York. The drive of these conveying means, even from the start, comprised at least one gear wheel, driven via a gearbox, which engages in chain links. Flat conveying elements or stair elements of the conveying means, which are guided in circulation in an endless loop, are connected to the chain links. Persons, packages, boxes and so on, for example, are transported over a horizontal distance and possibly up or down on the conveying elements or the stair elements. Examples of such continuous movement means and their drives are shown by DE 2 252 134 A1, WO 03/066 500 A1, EP 0 013 793 A1 and DE 1 456 375 A1.

Moving walkways and escalators are known which do not only run over straight distances, but also those which lead around curves, that is to say have curved sections.

It is also possible that moving walkways do not just lead in horizontal planes but also uphill or downhill, with curved transitions between rising or falling sections and horizontal planes. Even in escalators, a transition is made between a rising or falling transport plane and a horizontal transport plane. If mention is made of a transport plane in the following, both horizontal planes and also rising or falling planes and their transitions to horizontal planes are understood.

When moving walkways comprising plate conveyor belts are produced, the length of the moving walkway is determined by the actual length of the plate conveyor belt which comprises the interconnected plate conveyor elements, wherein the length of the moving walkway can be produced only in the steps predefined by the length of the plate conveyor elements. The length of the tracks on which the plate conveyor elements are guided must then be matched to the length of the plate conveyor belt, which always corresponds to a multiple of the length of an individual plate conveyor element.

Matching the length of the tracks to the actual length of the plate conveyor belt is a problem, in particular when plate conveyor belts have curves. Different curve radii and curve forms lead to the length of the tracks deviating from the actual length of the plate conveyor belt, wherein this deviation has to be compensated for onsite following the construction of the tracks.

SUMMARY OF THE INVENTION

The invention is based on the object of providing a plate conveyor belt of the type mentioned at the beginning which is suitable for a moving walkway, in which the length of the tracks can be matched to the length of the plate conveyor belt in a simple way.

According to the invention, this object is achieved by a plate conveyor belt which has the features of the independent claim.

Preferred and advantageous refinements of the invention are the subject matter of the subordinate claims.

Since, in the plate conveyor belt according to the invention, length adjusting pieces are provided between track elements that adjoin one another, the length of the tracks can be matched simply and without difficulty to the length of the plate conveyor belt.

In one embodiment of the invention, length adjusting pieces are provided which have edges that are aligned obliquely relative to the longitudinal extent of the tracks of the track elements, and that the ends of track elements for the contact of length adjusting pieces have edges which are likewise aligned obliquely relative to the longitudinal extent of the tracks.

In a preferred embodiment of the invention, coupling pieces are provided between the central tracks of track elements that adjoin one another, in particular of track elements between which length adjusting pieces are arranged. The cross-sectional shape of the coupling pieces corresponds to the cross-sectional shape of the central tracks, which guide the plate conveyor elements laterally.

In a practical embodiment of the invention, both multiple length adjusting pieces and also multiple coupling pieces for the central tracks having different dimensions (in each case in the form of a "set") are provided, so that the respective suitable length adjusting piece can be selected from the set comprising length adjusting pieces and/or the respective suitable coupling piece can be selected from the set comprising coupling pieces.

In practice, the procedure can be such that a coupling piece having a suitable length is inserted between track elements that adjoin one another, and then suitable length adjusting pieces are inserted into the openings. It is particularly advantageous here if the length adjusting piece has edges which are oblique relative to the longitudinal extent of the tracks. In this embodiment, the length adjusting pieces can simply be pushed so far into the openings that they bridge the tracks of the track elements that are connected to one another substantially without any play. Thus, accurate adjustment of the length of the trackway is possible. In practice, the procedure can be such that firstly a coarse adjustment is made by the suitable coupling piece and the associated suitable length adjusting pieces being inserted, and the fine adjustment of the length adjustment can then be carried out by further insertion of the length adjusting pieces into the openings between the track elements.

Further details and features of the invention emerge from the following description of preferred exemplary embodiments with reference to the drawings.

DETAILED DESCRIPTION OF THE INVENTION

Figure 1:
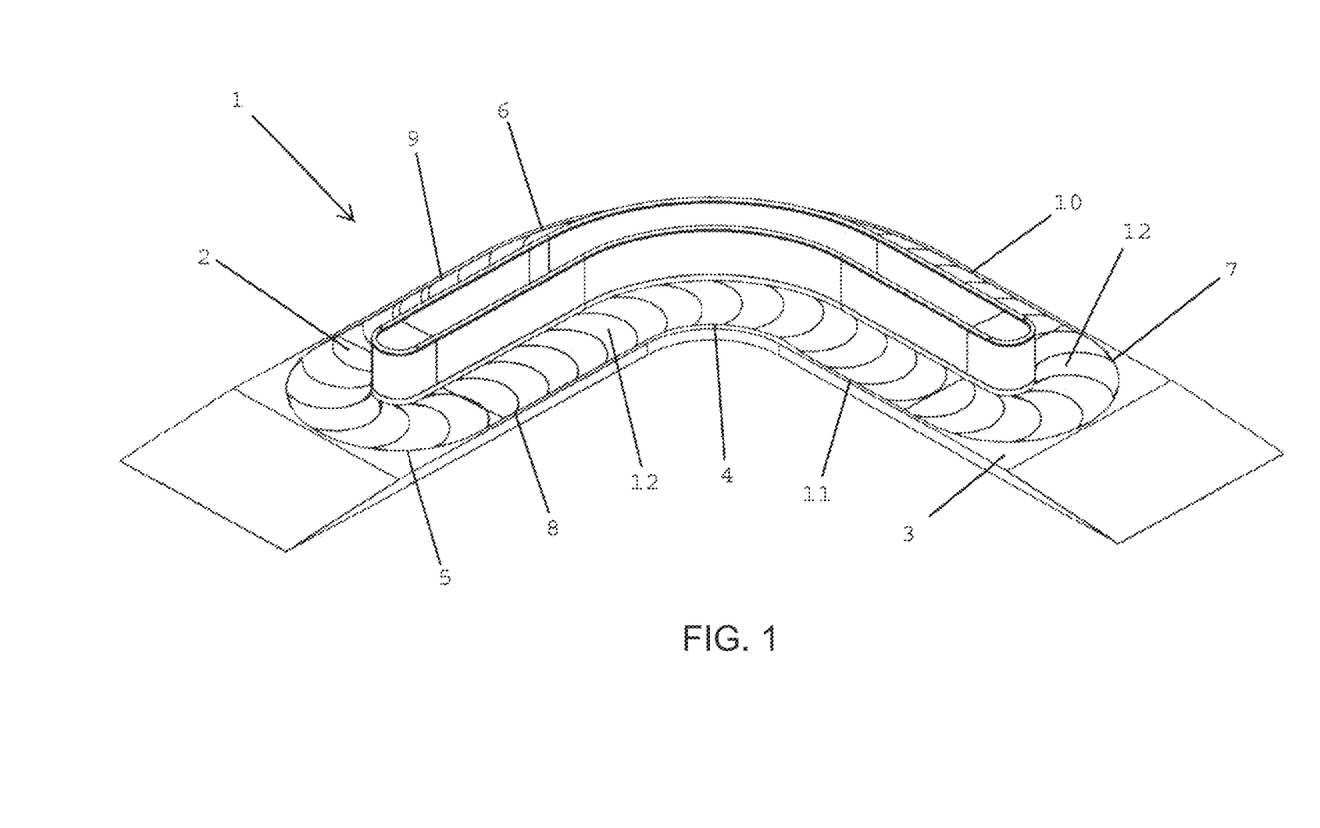
FIG. 1 shows a moving walkway having a plate conveyor belt schematically and in an oblique view.

FIG. 1 illustrates a moving walkway 2 comprising a plate conveyor belt 1 which, in a transport plane 3 that is horizontal in the embodiment illustrated, leads around a plurality of curves 4 to 7, between which there are straight transport sections 8 to 11. The plate conveyor belt 1 of the moving walkway 2 comprises a multiplicity of approximately sickle-shaped plate conveyor elements 12, which are connected to one another in such a way that they can move both around curves 3 to 7 and also along straight transport sections 8 to 11.

Figure 2:
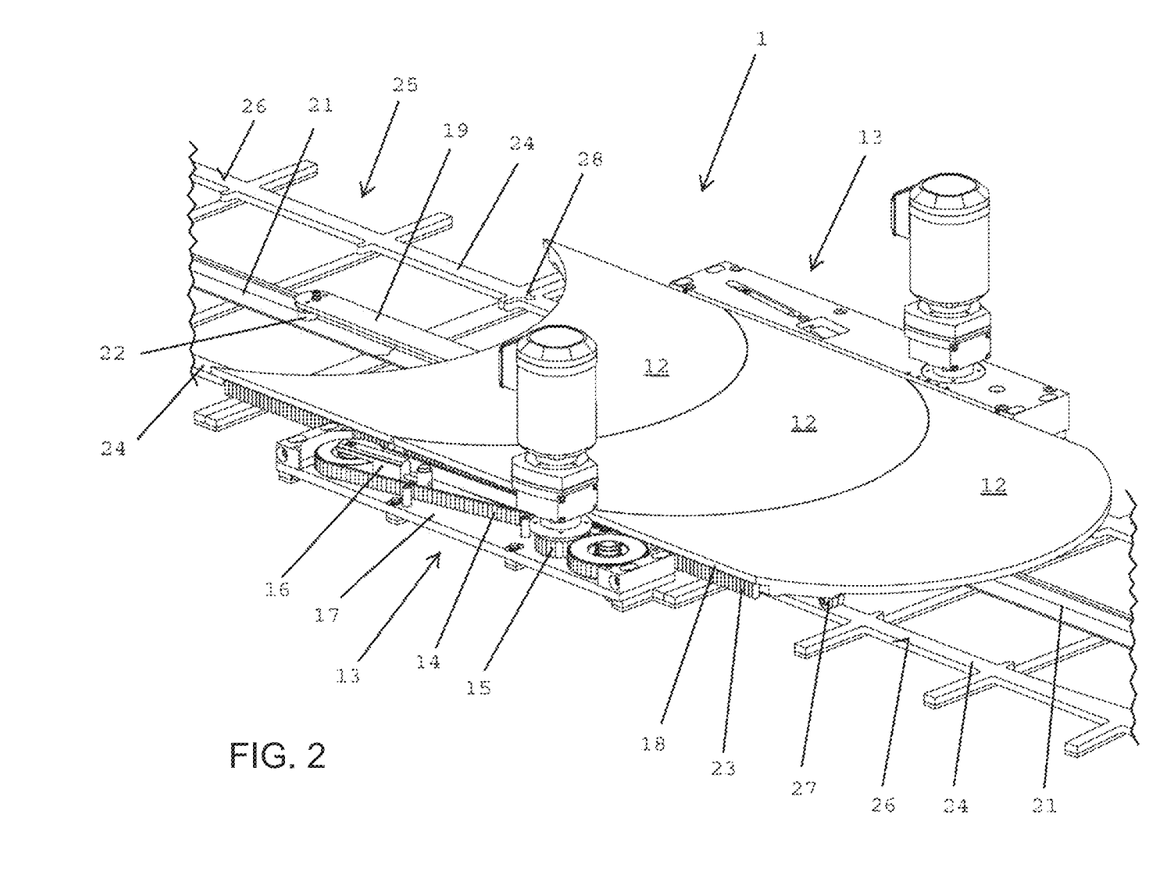
FIG. 2 shows a detail of a plate conveyor belt in the area of the drive.

A preferred embodiment of a drive for a plate conveyor 1 according to the invention is illustrated in FIG. 2, although other drives can also be used within the context of the invention. The drive shown of the plate conveyor belt 1 comprising plate conveyor elements 12 has drive units 13, which have externally toothed belts 14, which are guided between deflection rollers, a driving belt pulley 15 and rollers of a pressure unit. Also provided is a tensioning device 16, which acts on one of the deflection rollers and, together with the aforementioned components, is arranged on a mounting plate 17. The plate conveyor elements 12 each have a top surface, a bottom surface, two side surfaces 18 and an arm 19 with a guide piece 22 rolling on a central track 21.

In order to transmit the drive energy from the belts 14 to the plate conveyor elements 12, a rack 23 is arranged on each of the side surfaces 18 of the plate conveyor elements 12. In order that the belt 14 engaging in the rack 23 is better protected against dirt, objects on the plate conveyor elements 12 and against unintended contact with persons, the rack 23 is arranged in a lateral step in the side surfaces 18 on the plate conveyor elements 12. The rack 23 is arranged in the lateral step in such a way that the teeth of the rack 23 are located so as to be set back with respect to the side surfaces 18.

In FIG. 2 the drive is shown with two drive units 13 and the plate conveyor belt 1. The plate conveyor elements 12 are connected to one another and arranged to follow one another at a short distance and are guided along tracks 24. The tracks 24 are components of track elements 25, each track element 25 having two outer tracks 24 and the central track 21 in between. The plate conveyor elements 12 run with running rollers 27 on a top surface 26 of the outer tracks 24, and the central track 21 is used the for the lateral guidance of the plate conveyor elements 12 by means of guide rollers of the guide pieces 22.

Figure 3:
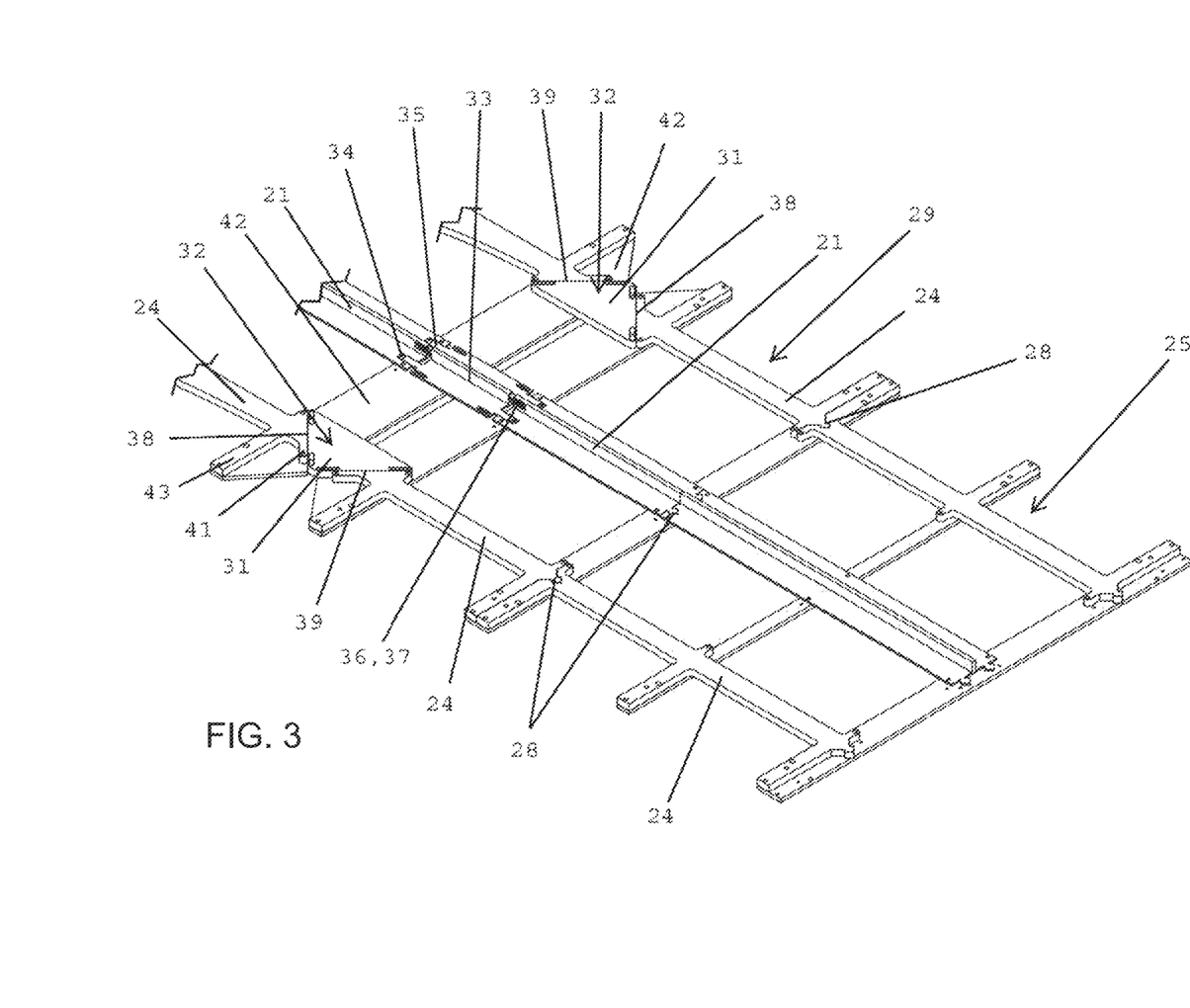
FIG. 3 shows track elements.

The track elements 25 are connected to one another by means of form-fitting couplings 28. FIG. 3 shows in more detail how track elements 25 that adjoin one another are connected to one another by the form-fitting couplings 28.

Figure 12:
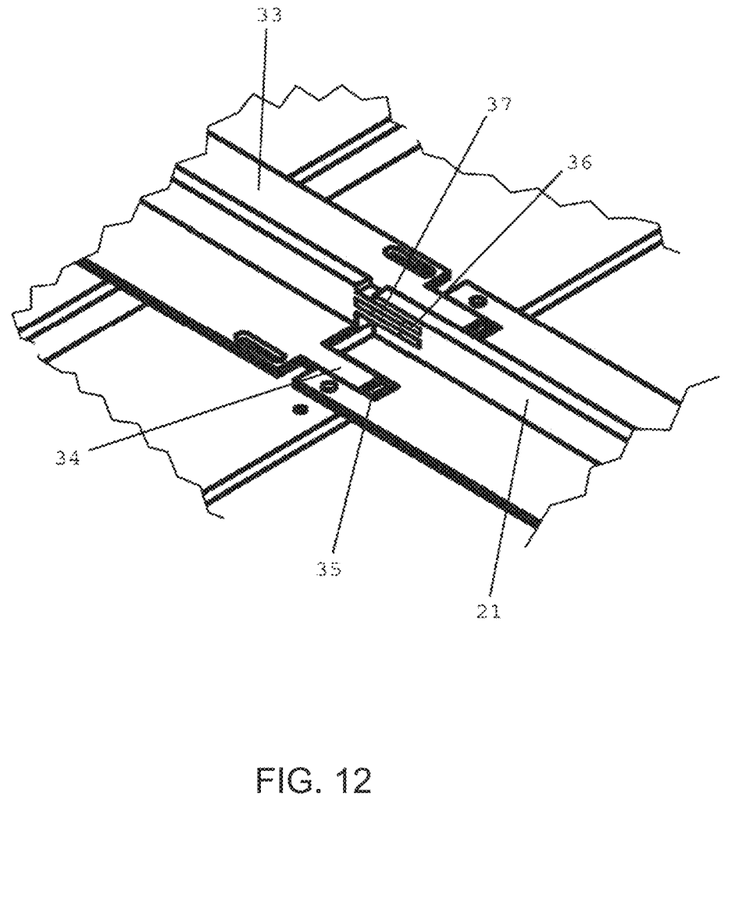
FIG. 12 shows a detail of central tracks adjoining one another with a coupling piece.

For length adjustment, further track elements 29 (adjusting track elements) are provided, which are equipped at one end with the couplings 28 and at the other hand have areas to receive length adjusting pieces 31 for the outer tracks 24. When the track elements 29 are connected to one another, these areas form openings 32, into which the length adjusting pieces 31 can be inserted. In addition to the length adjusting pieces 31 between the outer tracks 24 of track elements 29 adjoining one another, a coupling piece 33 is inserted in between the central tracks 21. The coupling pieces 33 have at their ends extensions 34 which, when installed, engage in recesses 35 at the ends of the central tracks 21. In addition, the central tracks 21 and the coupling pieces 33 have horizontally aligned slots 36 and tongues 37 at their ends facing each other, with which they interengage in the manner of a comb and therefore form a continuous guide for the guide pieces 22 (FIG. 12).

Figure 5:
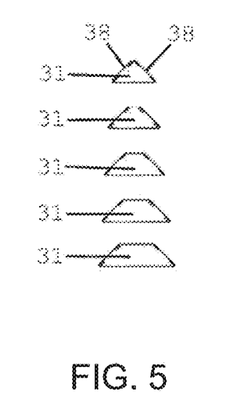
FIG. 5 shows a set of length adjusting pieces.
Figure 6:
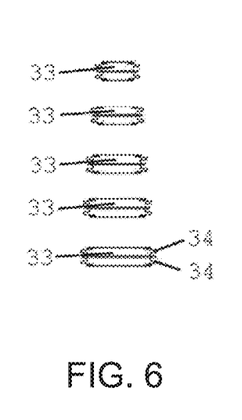
FIG. 6 shows a set of coupling pieces.
Figure 7:
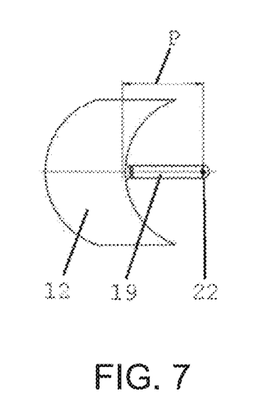
FIG. 7 shows a single plate conveyor element.

As shown in FIGS. 5 and 6, there is a set comprising length adjusting pieces 31 with different dimensions, just as there is a set comprising coupling pieces 33 with different lengths.

It is preferable that the length adjusting pieces 31 have edges 38 aligned obliquely relative to the longitudinal extent of the tracks 24 and, for example, are substantially triangular or trapezoidal. In this preferred embodiment of the invention, it is important that the edges 38 are aligned relative to one another in a V shape.

Provision is made for the openings 32 provided between the ends of the tracks 24 of track elements 29 that adjoin one another to have edges 39 which are arranged at the ends of the tracks 24 and are oblique relative to the longitudinal extent of the tracks 24. The oblique positioning (alignment) of the edges 39 is identical to the oblique positioning (alignment) of the oblique edges 38 of the length adjusting pieces 31. Therefore—as shown in FIG. 3—the length adjusting pieces 31 can rest with their oblique (lateral) edges 38 continuously on the edges 39 of the openings 32.

For example, provision can be made for the edges 39 of the tracks 24 to be formed by bars 41, which are aligned obliquely relative to the longitudinal extent of the tracks 24. The angles of the oblique alignment of the bars 41 correspond to the angles of the oblique edges 38 of the length adjusting pieces 31 resting on these bars 41. By means of the bars 41, the length of the transition region from one length adjusting piece 31 to the adjacent tracks 24 can be lengthened, which leads to an improved rolling behavior of the running rollers 27 over the transition region.

In principle, within the context of the invention, it would also be possible to use length adjusting pieces 31 having edges 38 which are not V-shaped but, for example, arranged in parallel, wherein the edges 39 of the openings 32 and ends of the tracks 24 should be aligned substantially correspondingly obliquely. In this embodiment of the invention, too, substantially shock-free movement over the transition between the tracks 24 on length adjusting pieces 38 would be possible, since the running rollers 27 would simultaneously run both on the respective track 24 and also on the length adjusting piece 38 as a result of the oblique positioning of the transition region. The disadvantage would be that a greater number of length adjusting pieces 38 of different widths would have to be kept in stock in order that the gaps between the tracks 24 and length adjusting pieces 38 do not become too large.

In the area of joints between track elements 29 with length adjustment that adjoin one another, two plates 42 are provided underneath the track elements 29, and are connected to the ends of the track elements 29, for example by means of screws or the like. For a more stable connection between the ends of the outer tracks 24 and the plates 42, bars 43 projecting transversely are additionally provided, as they are also provided in track elements 25, 29 to be connected directly to one another via the couplings 28.

Figure 8:
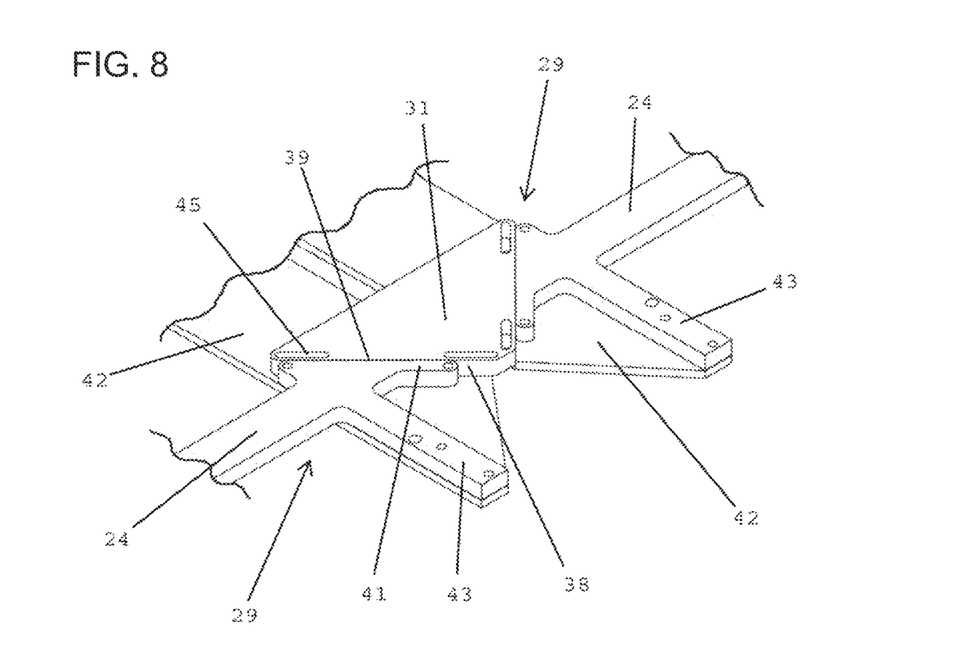
FIG. 8 shows a length adjusting piece inserted between track elements in an oblique view.
Figure 9:
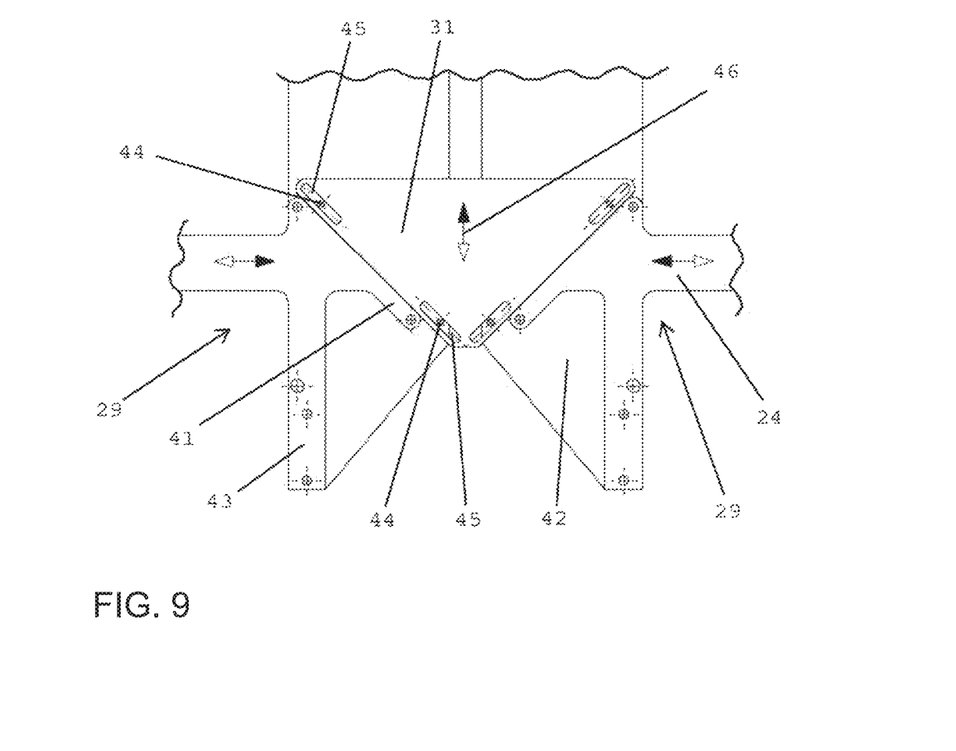
FIG. 9 shows a plan view relating to FIG. 8.
Figure 10:
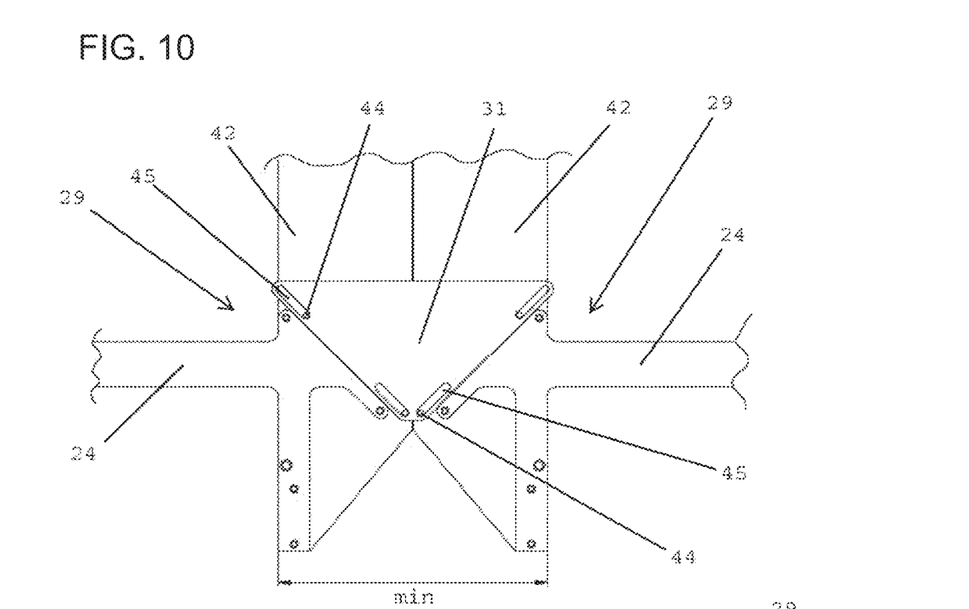
FIG. 10 shows a view analogous to FIG. 9 with track elements adjoining one another directly with a minimum spacing between track elements.

FIGS. 8 to 10 show how a length adjusting piece 31 is inserted between track elements 29 that adjoin one another, wherein screws 44, which are guided through slots 45 in the length adjusting pieces 31, are provided to fix the length adjusting piece 31 in the correct position between the track elements 29.

Figure 11:
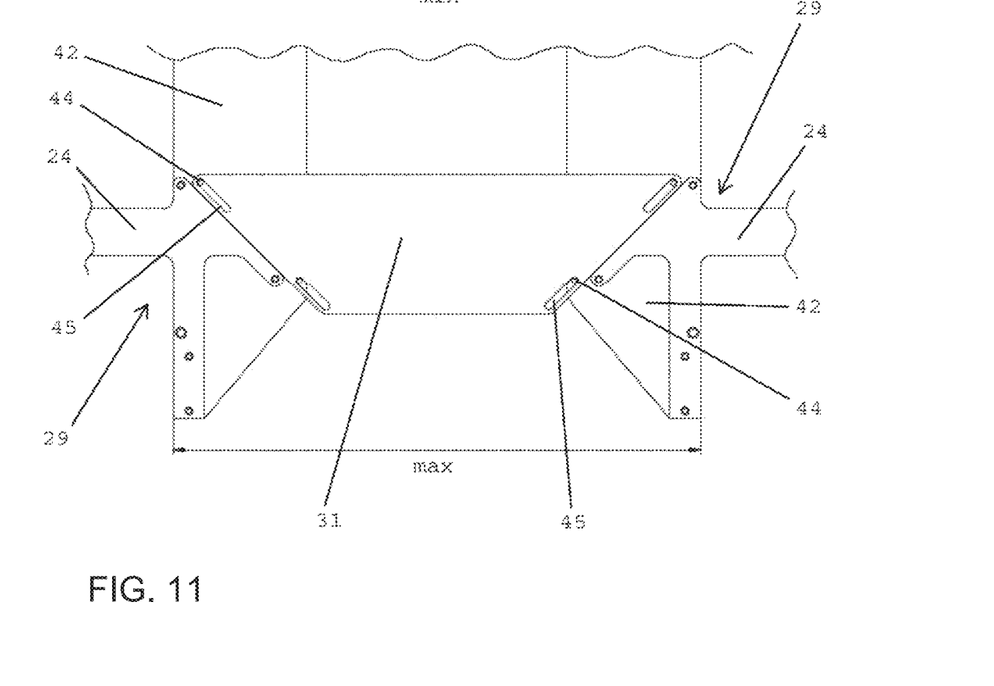
FIG. 11 shows a view analogous to FIG. 9 with a maximum spacing between track elements.

FIGS. 8 and 9 show a central spacing between track elements 29 that adjoin one another, whereas FIGS. 10 and 11 show the largest and smallest spacings "min" and "max" between track elements 29 that adjoin one another. FIG. 10 shows the shortest possible spacing "min" between track elements 29 that adjoin one another, and FIG. 11 shows the largest possible spacing "max" between track elements 29 that adjoin one another, wherein, in the case in FIG. 10, a triangular length adjusting piece 31 is provided in the opening 32 and, in the case in FIG. 11, a trapezoidal length adjusting piece 31 is provided in the opening 32.

Figure 4:
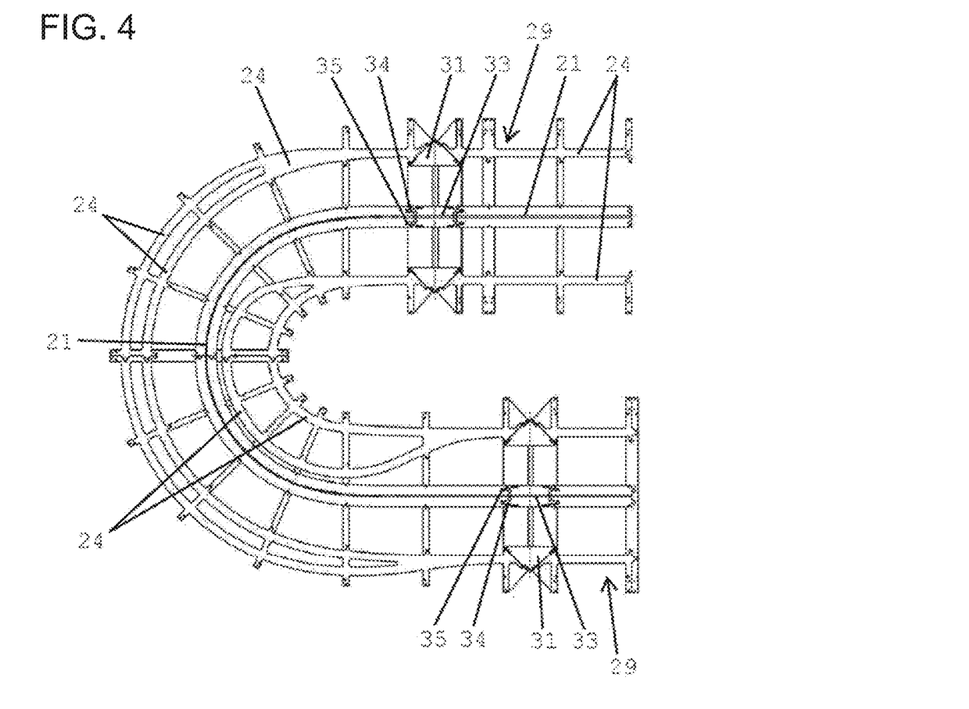
FIG. 4 shows tracks having a 180° curve and two straight sections.

The track elements 29 provided for the length adjustment-cf. FIG. 4—are provided with different lengths.

In practice, when adjusting the length of a straight transport section 8 to 11 of a moving walkway 2 which has a plate conveyor belt 1 according to the invention, the procedure is such that the trackway formed by the track elements 25 and 29 is produced in the desired form of the moving walkway 2, wherein the number and shape of the curves and also the overall length of the chain of plate conveyor elements 12 also has to be taken into account. To exactly adjust the length of the trackway which is formed by the track elements 25 and 29, the length adjusting pieces 31 are used. Firstly, by choosing a suitable length adjusting piece 31 from the set shown in FIG. 5, a coarse adjustment is made. A fine adjustment is then made by the length adjusting piece 31—as shown by the double arrow 46 in FIG. 9—being pushed into the triangular openings 32 between track elements 29 that adjoin one another.

It is not a disadvantage if there is slight play between the central tracks 21 of track elements 29 and the coupling piece 33 inserted in between the central tracks 21 (FIG. 6), since this is compensated for by the tongues 39 sliding into the slots 36.

In summary, an exemplary embodiment of the invention can be described as follows:

A plate conveyor book 1 for moving walkways 2 comprises a trackway with tracks 24 formed by track elements 29 and a central track 21 used as a guide for plate conveyor elements 12 of the plate conveyor belt 1. The length of the trackway is adjustable. For this purpose, substantially triangular openings 32 which are delimited by bars 41 are provided between track elements 29 that adjoin one another. Triangular or trapezoidal length adjusting pieces 31 are inserted into the openings 32 and pushed in to such an extent that the oblique edges 38 of the length adjusting pieces 31 rest on the edges 39 of the openings 32 that are formed by the bars 41. The central tracks 21 of track elements 29 that adjoin one another are connected to one another by coupling pieces 33.

| List of designations | |
|---|---|
| 1 | Plate conveyor belt |
| 2 | Moving walkway |
| 3 | Transport plane |
| 4 | Curve |
| 5 | Curve |
| 6 | Curve |
| 7 | Curve |
| 8 | Straight transport section |
| 9 | Straight transport section |
| 10 | Straight transport section |
| 11 | Straight transport section |
| 12 | Plate conveyor element |
| 13 | Drive unit |
| 14 | Belt |
| 15 | Belt pulley |

| List of designations -continued | |
|---|---|
| 16 | Tensioning device |
| 17 | Mounting plate |
| 18 | Side surface |
| 19 | Arm |
| 20 | — |
| 21 | Central track |
| 22 | Guide piece |
| 23 | Rack |
| 24 | Track |
| 25 | Track element |
| 26 | Top surface |
| 27 | Running roller |
| 28 | Coupling |
| 29 | Track element |
| 30 | — |
| 31 | Length adjusting piece |
| 32 | Opening |
| 33 | Coupling piece |
| 34 | Extension |
| 35 | Recess |
| 36 | Slot |
| 37 | Tongue |
| 38 | Edge (of length adjusting piece) |
| 39 | Edge (of the track) |
| 40 | — |
| 41 | Bar (for guidance) |
| 42 | Plate |
| 43 | Bar (for stability) |
| 44 | Screw |
| 45 | Slot |
| 46 | Double arrow |

The invention claimed is:

1. A plate conveyor belt, comprising:
track elements lined up in a row and connected to one another, said track elements each having tracks including outer tracks and a central track disposed between said outer tracks;
plate conveyor elements connected to one another and guided on said tracks;
length adjusting pieces disposed at joints of said track elements that follow one another; and
coupling pieces disposed between said central tracks of said track elements that adjoin one another, said coupling pieces having a cross-sectional shape corresponding to a cross-sectional shape of said central tracks.

2. The plate conveyor belt according to claim 1, wherein:
said length adjusting pieces have edges which are oblique relative to a longitudinal extent of said tracks; and
disposed between adjacent said rail elements are openings, said rail elements having edges defining said openings which are oblique relative to the longitudinal extent of the tracks.

3. The plate conveyor belt according to claim 2, wherein said edges of said length adjusting pieces and said edges defining said openings are oblique by a same angle relative to the longitudinal extent of said tracks.

4. The plate conveyor belt according to claim 2, wherein said openings are disposed in an area of said tracks of said track elements.

5. The plate conveyor belt according to claim 2, further comprising bars and said openings are delimited by said bars.

6. The plate conveyor belt according to claim 1, further comprising plates, which are connected to ends of said track elements, and are disposed on an underside of said track elements.

7. The plate conveyor belt according to claim 5, wherein said bars are disposed on an upper side of said plates.

8. The plate conveyor belt according to claim 7, wherein said bars are formed in one piece with said plates or are connected to said plates.

9. The plate conveyor belt according to claim 1, wherein said length adjusting pieces have a triangular outline.

10. The plate conveyor belt according to claim 9, wherein said triangular outline corresponds to an equilateral triangle.

11. The plate conveyor belt according to claim 1, wherein said length adjusting pieces has a trapezoidal outline.

12. The plate conveyor belt according to claim 1, wherein said central track has a web running longitudinally, open at a top and pointing toward said plate conveyor elements.

13. The plate conveyor belt according to claim 1, wherein:
   said central tracks have ends with recesses formed therein; and
   said coupling pieces have extensions at their ends, and in that said extensions engage in said recesses in said ends of said central tracks.

14. The plate conveyor belt according to claim 13, wherein:
   said plate conveyor elements have guide pieces; and
   at their mutually facing ends, said central tracks and said coupling pieces have horizontally aligned slots formed therein and tongues, with which they interengage in a manner of a comb and therefore form a continuous guide for said guide pieces.

* * * * *